(12) United States Patent
Hamalainen et al.

(10) Patent No.: US 11,002,127 B2
(45) Date of Patent: May 11, 2021

(54) ROCK DRILLING DEVICE

(71) Applicant: SANDVIK MINING AND CONSTRUCTION OY, Tampere (FI)

(72) Inventors: Pasi Hamalainen, Tampere (FI); Timo Setala, Tampere (FI); Juha Pursimo, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 16/544,852

(22) Filed: Aug. 19, 2019

(65) Prior Publication Data

US 2020/0072035 A1 Mar. 5, 2020

(30) Foreign Application Priority Data

Aug. 31, 2018 (EP) ..................................... 18192037

(51) Int. Cl.
| | |
|---|---|
| *E21B 45/00* | (2006.01) |
| *E21B 44/00* | (2006.01) |
| *E21B 1/02* | (2006.01) |
| *G01V 1/30* | (2006.01) |
| *E21B 7/02* | (2006.01) |
| *E21B 47/007* | (2012.01) |

(52) U.S. Cl.
CPC ................ *E21B 45/00* (2013.01); *E21B 1/02* (2013.01); *E21B 7/025* (2013.01); *E21B 44/00* (2013.01); *E21B 47/007* (2020.05); *G01V 1/301* (2013.01); *G01V 2210/1216* (2013.01)

(58) Field of Classification Search
CPC .......... E21B 45/00; E21B 47/007; E21B 1/02; E21B 7/025; E21B 44/00; G01V 1/301; G01V 2210/1216
See application file for complete search history.

(56) References Cited

U.S. PATENT DOCUMENTS

| | | | |
|---|---|---|---|
| 4,671,366 A | 6/1987 | Uitto et al. | |
| 6,480,118 B1 | 11/2002 | Rao | |
| 6,791,469 B1 * | 9/2004 | Rao .......................... | E21B 47/00 175/26 |

FOREIGN PATENT DOCUMENTS

| | | | | |
|---|---|---|---|---|
| CA | 2916148 A1 * | 12/2014 | ............... | B25D 9/26 |
| CL | 201902341 | 8/2019 | | |
| WO | 03/033216 A1 | 4/2003 | | |
| WO | 2010037905 A1 | 4/2010 | | |

* cited by examiner

*Primary Examiner* — Tara Schimpf
*Assistant Examiner* — Dany E Akakpo
(74) *Attorney, Agent, or Firm* — Corinne R. Gorski

(57) ABSTRACT

A method of monitoring a rock drilling and a rock drilling device includes generating a stress wave, which propagates in a tool of the rock drilling device, measuring the stress wave propagating in the tool and measuring a drilling parameter indicating a drilling penetration rate. The method further includes identifying, from the measured stress wave propagating in the tool, at least one of a compressive stress wave and a tensile stress wave of a reflected stress wave reflected from a rock to be drilled back to the tool, determining at least one property of the at least one of the compressive stress wave and the tensile stress wave of the reflected stress wave, detecting, on the basis of a change in the at least one property of the at least one of the compressive stress wave and the tensile stress wave, that the tool is approaching the cavity.

13 Claims, 3 Drawing Sheets

ROCK DRILLING DEVICE

RELATED APPLICATION DATA

This application claims priority under 35 U.S.C. § 119 to EP Patent Application No. 18192037.2, filed on Aug. 31, 2018, which the entirety thereof is incorporated herein by reference.

FIELD OF THE INVENTION

The invention relates to a rock drilling device and a method of monitoring rock drilling.

BACKGROUND

In rock drilling holes are drilled in the rock by a percussion rock drilling machine. In this context, the term "rock" is to be understood broadly to also cover a boulder, rock material, crust and other relatively hard material.

The rock drilling machine includes a percussion device, which gives impact pulses to the tool either directly or through a shank, and thereby generates stress waves travelling in the tool. The impact of the percussion device to the tool or the shank provides a compression stress wave in the tool, where the wave propagates to the outermost end of the tool. When the compression stress wave reaches the tool's outermost end, the tool penetrates into the rock due to the influence of the wave. Some of the energy of the compression stress wave generated by the percussion device is reflected back as a reflected wave, which propagates in the opposite direction in the tool, i.e. towards the percussion device. Depending on the situation, the reflected wave may include only a compression stress wave or a tensile stress wave. However, the reflected wave typically includes both the tension stress wave component and the compression stress wave component. The stress wave travelling in the tool may be measured and the measuring result may be employed in controlling of the rock breaking device as described in U.S. Pat. No. 4,671,366, for example.

SUMMARY

An object of the present invention is to provide a novel rock breaking device and a method of monitoring a progress of rock drilling.

The invention is based on the idea of monitoring a progress of the rock drilling, and especially monitoring the drilling for detecting the tool of the rock breaking device approaching a cavity in the rock before the tool actually enters the cavity.

With the invention disclosed it may be detected proactively that the tool of the rock drilling device is approaching a cavity before the tool actually enters the cavity so that the operations of the rock drilling device may be controlled so as to avoid the tool to enter the cavity with full drilling power.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

For the sake of clarity, the figures show some embodiments of the disclosed solution in a simplified manner. In the figures, like reference numerals identify like elements.

DETAILED DESCRIPTION

Rock drilling is performed by drilling holes in a rock by a rock drilling device including at least one rock drilling machine. In this context, the term "rock" is to be understood broadly to cover also a boulder, rock material, crust and other relatively hard material. The rock drilling machine has an impact mechanism, which provides impact pulses to a tool either directly or through an adapter, such as a drill shank. The impact pulse generates a stress wave which propagates in the tool. When the stress wave reaches the end of the tool facing the rock to be drilled, the tool penetrates into the rock due to the influence of the wave. Some of the energy of the stress wave is reflected back as a reflected wave, which propagates in the opposite direction in the tool, i.e. towards the impact mechanism. Depending on the situation, the reflected stress wave may comprise only a compression stress wave or a tensile stress wave. However, the reflected stress wave typically comprises both tensile and compression stress wave components.

Figure 1:
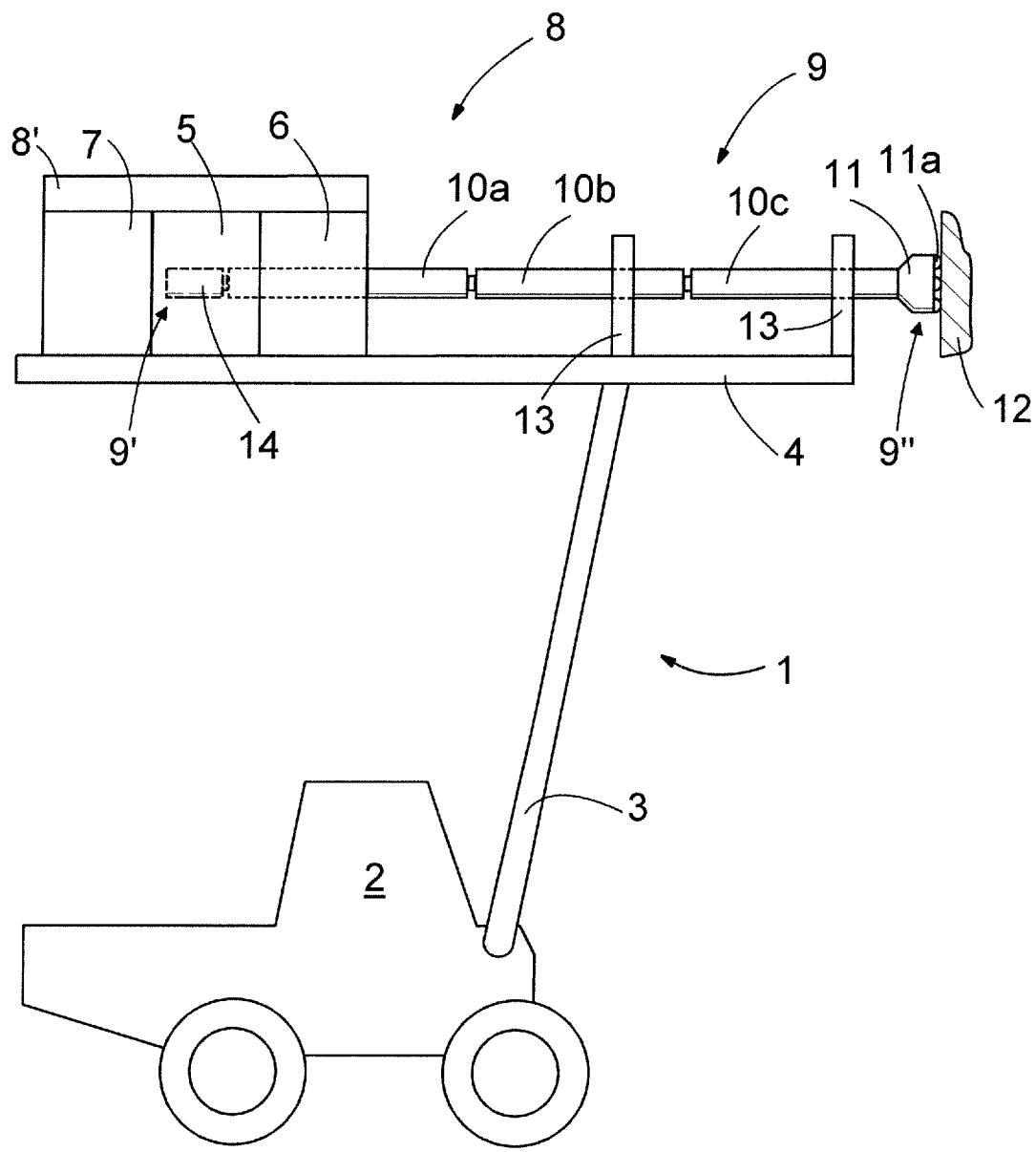
FIG. 1 is a schematic side view of a rock drilling rig and a rock drilling machine.

FIG. 1 shows schematically a significantly simplified side view of a rock drilling rig 1. The rock drilling rig 1 includes a movable carrier 2 and a boom 3 at the end of which there is a feed beam 4 provided with a rock drilling machine 8 having a frame 8', an impact mechanism 5 and a rotating mechanism 6. The rock drilling rig 1 of FIG. 1 further includes a tool 9, the proximal end 9' of which is coupled to the rock drilling machine 8 and the distal end 9" of which is oriented towards the rock 12 to be drilled. The proximal end 9' of the tool 9 is shown in FIG. 1 schematically by a broken line.

Figure 2:
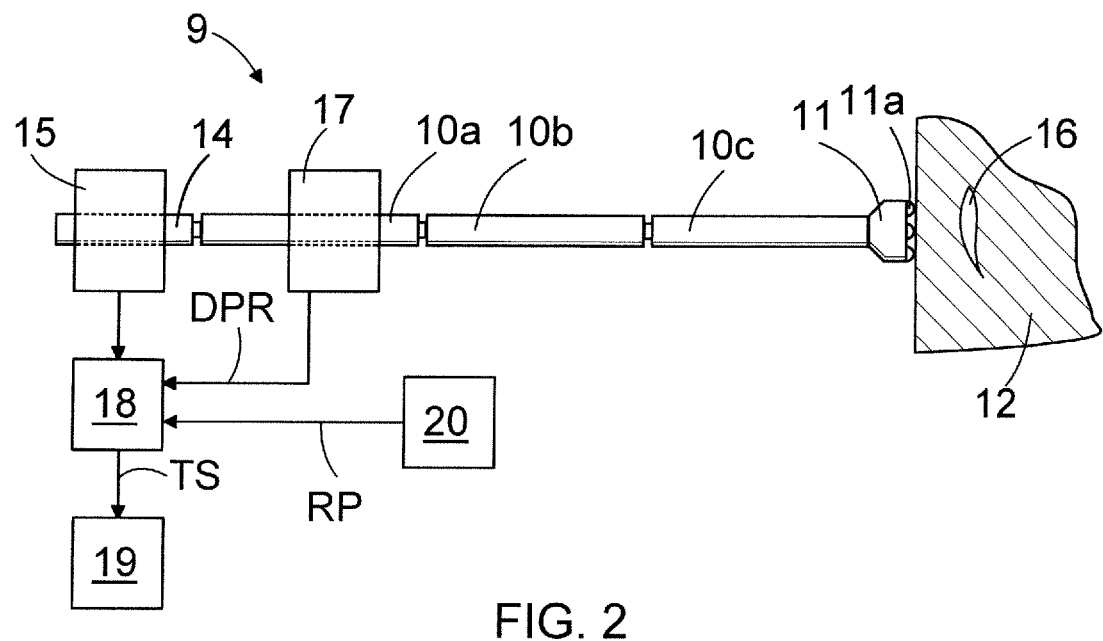
FIG. 2 is a schematic side view of a tool of the rock drilling machine shown in FIG. 1.

The tool 9 of the rock drilling rig 1 of FIG. 1 includes drill rods 10a, 10b, 10c or drill stems 10a, 10b, 10c or drill tubes 10a, 10b, 10c, a drill shank 14 at the proximal end 9' of the tool 9 and a drill bit 11 at the distal end 9" of the tool 9. The drill bit 11 may be provided with buttons 11a, although other drill bit structures are also possible. The interconnected drill rods, drill stems or drill tubes form a drill string. In the embodiment of FIG. 1, as well as in FIG. 3, the drill string, the drill shank 14 and the drill bit 11 form the tool 9 of the rock drilling machine 8, the drill rods, drill stems or drill tubes, the drill shank 14 and the drill bit 11 being parts of the tool 9. In drilling with sectional drill rods, also known as long hole drilling, a number of drill rods depending on the depth of the hole to be drilled are attached between the drill bit 11 and the rock drilling machine 8. For simplicity reasons, it should be appreciated that the tool 9 includes the drill rods 10a-10c, the drill shank 14 and the drill bit 11, but depending on the actual implementation of the tool 9, the tool 9 may include the drill stems or the drill tubes instead of the drill rods. FIG. 2 shows schematically a side view of the tool 9 of the rock drilling machine 8 shown in FIG. 1.

The embodiment of FIG. 1 also disclosed guide supports 13 attached to the feed beam 4 for supporting the tool 9. Furthermore, the rock drilling rig 1 of FIG. 1 also includes a feed mechanism 7, which is arranged to the feed beam 4, in relation to which the rock drilling machine 8 is movably arranged. During drilling the feed mechanism 7 is arranged to push the rock drilling machine 8 forward on the feed beam 4 and thus to push the drill bit 11 against the rock 12.

FIG. 1 shows the rock drilling rig 1 considerably smaller in relation to the structure of the rock drilling machine 8 than what it is in reality. For the sake of clarity, the rock drilling rig 1 of FIG. 1 has only one boom 3, feed beam 4, rock drilling machine 8 and feed mechanism 7, although it is obvious that a rock drilling rig may be provided with a plurality of booms 3 having a feed beam 4, a rock drilling machine 8 and a feed mechanism 7. It is also obvious that the rock drilling machine 8 usually includes flushing means to prevent the drill bit 11 from being blocked. For the sake of clarity, no flushing means are shown in FIG. 1. The drilling machine 8 may be hydraulically operated, but it may also be pneumatically or electrically operated.

The rock drilling device or the rock drilling machine disclosed above is a top-hammer-type drilling device. The rock drilling device or the rock drilling machine may also have a structure other than explained above. In drilling machines used for down-the-hole-drilling the impact mechanism is located at the bottom of the drilling hole next to the drill bit, the drill bit being connected through the drill rods to the rotating mechanism located above the drilling hole.

The impact mechanism 5 may be provided with an impact piston reciprocating under the influence of pressure medium and striking to the tool either directly or through an intermediate piece, such as a drill shank or another kind of adapter, between the tool 9 and the impact piston. Naturally an impact mechanism of a different structure is also possible. The operation of the impact mechanism 5 may thus also be based on use of electromagnetism or hydraulic pressure without any mechanically reciprocating impact piston and in this context the term impact mechanism refers also to impact mechanisms based on such characteristics.

The stress wave generated by the impact mechanism 5 is delivered along the drill shank 14 and the drill rods 10*a* to 10*d* towards the drill bit 11 at the distal end 9″ of the tool 9. When the stress wave meets the drill bit 11, the drill bit 11 and its buttons 11*a* strike the rock 12 to be drilled, thereby causing to the rock 12 a strong stress due to which cracks are formed in the rock 12. Typically, part of the stress wave exerted on or acting on the rock 12 reflects back to the tool 9 and along the tool 9 back towards the impact mechanism 5. During drilling the rotating mechanism 6 transmits continuous rotating force to the tool 9, thus causing the buttons 11*a* of the drill bit 11 to change their position after an impact and strike to a new spot on the rock 12 at the next impact.

Figure 3:
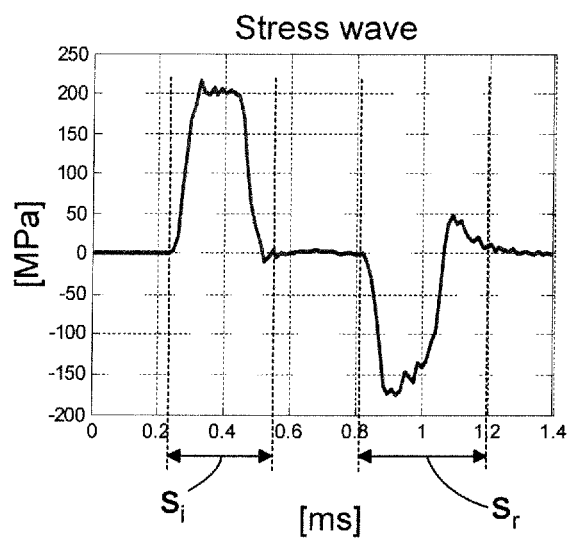
FIG. 3 shows schematically a stress wave appearing in rock drilling.

FIG. 3 shows schematically a stress wave, wherein the stress wave propagating towards the rock 12 to be drilled is denoted with a reference mark s, and the stress wave reflected from the rock 12 back to the tool 9 is denoted with a reference mark sr. As stated above, some of the energy of the stress wave generated into the tool and travelling towards the rock to be broken is reflected back as a reflected stress wave. The reflected stress wave is composed of at least one of a compressive stress wave and a tensile stress wave, i.e. the reflected stress wave is composed of the compressive stress wave and/or the tensile stress wave. The compressive stress wave and the tensile stress wave of the reflected stress wave may be measured by a measuring means 15 arranged in connection with the tool 9 or at an immediate vicinity of the tool 9. The operation of the measuring means 15 may for example be based on measuring changes in the magnetization of the tool 9 in response to the stress waves travelling in the tool 9. A variety of different suitable measuring means is known for a person skilled in the art of the rock breaking and a more detail configuration or an operation of these measuring means is not considered herein. The measuring means 15 are shown schematically in FIG. 2.

By the solution disclosed herein it may be detected, by using the at least one of the compressive stress wave and the tensile stress wave of the reflected stress wave that the tool 9 is approaching a cavity 16 in the rock 12 to be drilled before the tool 9 actually enters the cavity 16. The cavity 16 is an open space or an open gap in the rock, through which space or gap the stress waves do not substantially penetrate. The cavity 16 is shown schematically in FIG. 2 too.

In the solution for monitoring the rock drilling disclosed herein it is generated into the tool 9 a stress wave which propagates in the tool 9 towards the rock 12 to be drilled. The stress wave propagating in the tool 9 is measured by the measuring means 15. Furthermore, it is measured a drilling parameter indicating a drilling penetration rate, i.e. a rate at which the tool 9 penetrates in the rock 12.

The drilling parameter indicating the drilling penetration rate DPR may be a parameter that indirectly indicates the drilling penetration rate DPR. The parameter like that may for example be another drilling parameter, such as a feed oil flow to a feed actuator, such as a feed motor or a feed cylinder. The drilling penetration rate DPR may also be provided directly on the basis of position, velocity and/or acceleration sensors. The drilling parameter indicating the drilling penetration rate either directly or indirectly may be measured by measuring means 17 that is also shown very schematically in FIG. 2.

The measured stress wave propagating in the tool 9 as well as the drilling penetration rate DPR or another drilling parameter indicating the drilling penetration rate are forwarded from the respective measuring means 15, 17 to at least one computing unit 18, which at least operationally forms a part of the rock drilling machine 8 and which is configured to analyse the measured stress wave propagating in the tool 9 and the drilling parameter indicating the drilling penetration rate so as to determine if the tool 9 is approaching the cavity 16 in the rock 12. When considering the rock drilling rig 1 and the rock drilling machine 8 therein the computing unit 18 may be located at any suitable location in the rock drilling rig 1 and/or the rock drilling machine 8. The computing unit 18 may also be implemented by a cloud service system.

The computing unit 18 is configured to identify, from the measured stress wave propagating in the tool 9, at least one of the compressive stress wave and the tensile stress wave of the reflected stress wave reflected from the rock 12 to be drilled back to the tool 9. Furthermore, the computing unit 18 is configured to determine at least one property of the at least one of the compressive stress wave and the tensile stress wave of the reflected stress wave. The at least one additional property of the compressive stress wave and/or the tensile stress wave of the reflected stress wave may for example be at least one of an energy of the compressive or tensile stress wave, an attenuation or a duration of the compressive or tensile stress wave, an amplitude of the compressive or tensile stress wave, a shape of the compressive or tensile stress wave and any interrelation thereof. The shape of the compressive or tensile stress wave may be determined for example by measuring a frequency content of the compressive or tensile stress wave of the reflected stress wave.

The computing unit 18 is further configured to detect, on a basis of a change at least in the at least one of the compressive stress wave and the tensile stress wave of the reflected stress wave that the tool 9 is approaching the cavity 16 in the rock 12 before the tool 9 actually enters the cavity 16.

When the tool 9 approaches the cavity 16, the rock material in the rock in front of the cavity 16 as seen in the drilling direction bends or vibrates, thereby preventing the stress waves generated into the tool 9 to penetrate through the rock material to the same extent than through a solid rock material. This phenomena can be detected is response to a change in a level in the at least one property of the at least one of the compressive stress wave and the tensile stress wave when compared to a level of the same at least one property at the beginning of the measurement of the stress wave. The level in the at least one property of the at least one of the compressive stress wave and the tensile stress wave at the beginning of the measurement of the stress wave, or a previous constant level of the at least one property, provides a reference level to which the level of the at least one property of the at least one of the compressive stress wave and the tensile stress wave is compared during the measurement of the stress wave for detecting the tool 9 possibly approaching the cavity 16 before the tool 9 actually enters the cavity 16. The change in the level of the at least one property of the at least one of the compressive stress wave and the tensile stress wave in response to which the tool 9 is interpreted to approach the cavity 16 may be a significant change in the level, such as a change of five, ten or twenty percent.

When it is detected that the tool 9 is approaching the cavity 16, at least one cavity-related action may be initiated in response to detecting the tool 9 approaching the cavity 16. For initiating at least one cavity-related action the computing unit 18 may send a respective trigger signal TS to a control unit 19, which at least operationally forms a part of the rock drilling machine 8. The control unit 19 may be located at any suitable location in the rock drilling rig 1 and/or the rock drilling machine 8. The control unit 19 may also form a part of the computing unit 18, or in other words, the computing unit 18 may also include the control unit 19 or provide the functionalities of the control unit 19.

The control unit 19 is configured to start the at least one cavity-related action in response to receiving the trigger signal TS. The cavity-related action may for example be controlling at least one operating parameter of the rock drilling machine, such as at least one of a percussion pressure, a feeding pressure, a rotating pressure, a flushing pressure and a percussion frequency, in response to detecting the tool approaching the cavity before the tool actually enters the cavity. By this way it may be avoided that the drilling, i.e. the tool 9, enters into the cavity with full power, which could cause either damage in the tool or in the rock drilling machine or which may cause a change in a direction of the hole to be drilled from an intended direction thereof. Alternatively, the cavity-related action may for example be a setting of a warning signal active for the operator of the rock drilling machine so that the operator may, according to his/her consideration, to initiate possible control actions due to the cavity 16.

According to an embodiment the computing unit 18 is configured to detect, on the basis of a change in the drilling parameter indicating the drilling penetration rate and a change in the at least one property of the at least one of the compressive stress wave and the tensile stress wave, that the tool is approaching the cavity in the rock before the tool actually enters the cavity. The change in the drilling parameter indicating the drilling penetration rate may refer to a specific change in an actual value of that drilling parameter, or to a change in a prevailing general level of that drilling parameter when compared to a level thereof at the beginning of the measurement period or a previous constant level. The change in the level may for example be five, ten or twenty percent.

According to an embodiment the computing unit 18 is configured to detect the tool 9 approaching the cavity 16 in response to a decrease in the drilling penetration rate DPR and a decrease in an amplitude of the compressive stress wave of the reflected stress wave before the tool 9 entering the cavity 16.

According to an embodiment the computing unit 18 is configured to detect the tool 9 approaching the cavity 16 in response to a decrease in the drilling penetration rate and an increase in an amplitude of the tensile stress wave of the reflected stress wave before the tool 9 entering the cavity 16.

According to an embodiment the computing unit 18 is configured to determine a ratio between the drilling parameter indicating the drilling penetration rate and the at least one property of the at least one of the compressive stress wave and the tensile stress wave of the reflected stress wave, and to detect the tool 9 approaching the cavity 16 on the basis of a change in the determined ratio between the drilling parameter indicating the drilling penetration rate and the at least one property of the at least one of the compressive stress wave and the tensile stress wave of the reflected stress wave. The change in the determined ratio may refer to a specific change in an actual value of that ration, or to a change in a prevailing general level of the determined ratio when compared to a level thereof at the beginning of the measurement period or a previous constant level. The change in the level may for example be five, ten or twenty percent.

According to an embodiment the rock drilling machine further comprises a measuring means 20 for measuring a rotation pressure RP of the rock drilling machine, and the at least one computing unit 18 is configured to detect the tool 9 approaching the cavity 16 in response to a combination of the decrease in the drilling penetration rate, an increase in the rotation pressure RP of the rock drilling machine and at least one of the decrease in the amplitude of the compressive stress wave of the reflected stress wave and the increase in the amplitude of the tensile stress wave of the reflected stress wave. The measuring means 20 for measuring the rotation pressure may for example include a pressure sensor at a rotation motor.

Figure 4:
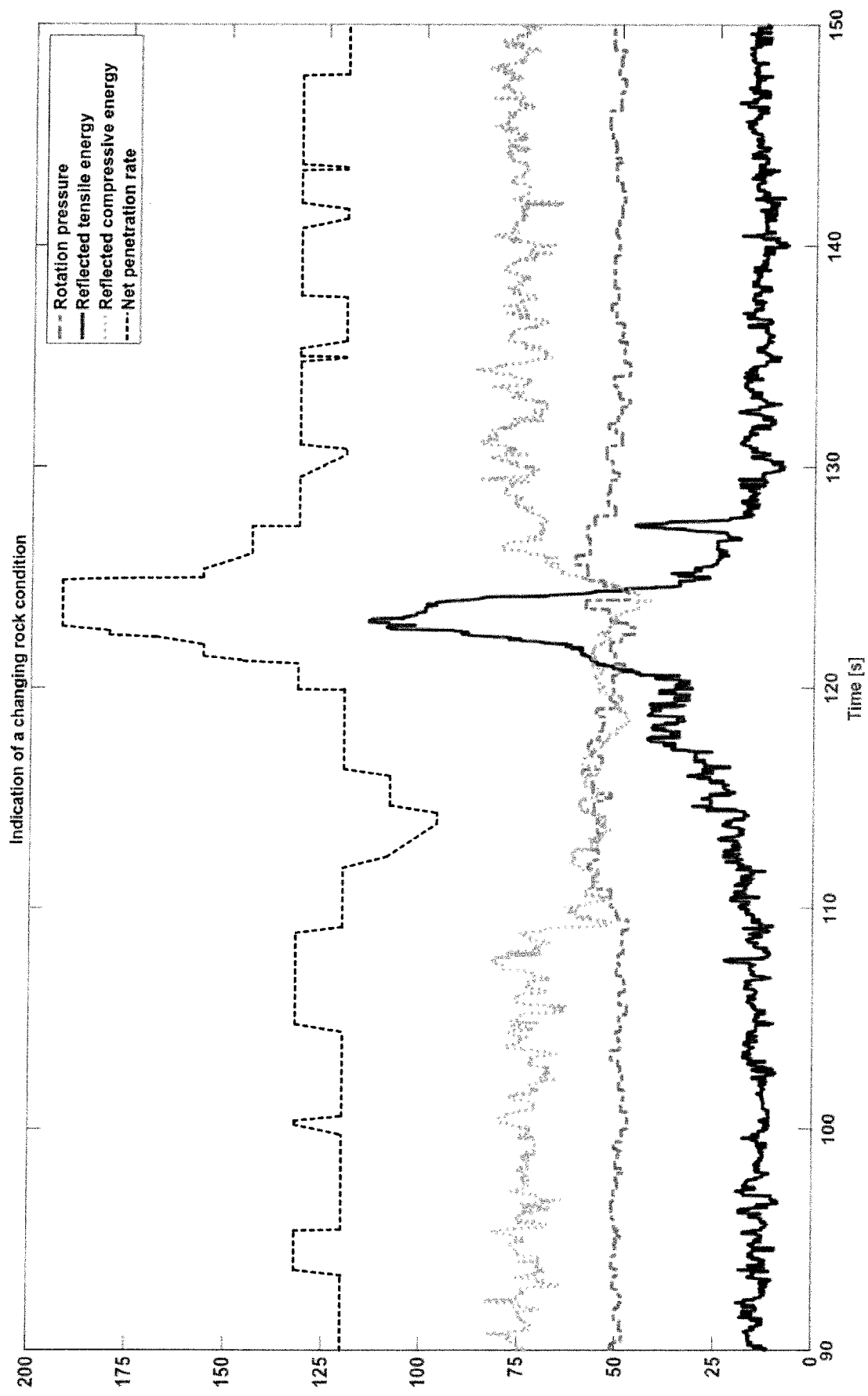
FIG. 4 shows schematically graphs indicating energy amplitudes of reflected stress wave components, a drilling penetration rate and a rotation pressure during an operation of a rock drilling machine.

An example of FIG. 4 discloses schematically graphs indicating energy amplitudes of the compressive stress wave and the tensile stress wave of the reflected stress wave, as well as a drilling penetration rate and rotation pressure in a drilling situation wherein a tool 9 eventually enters a cavity 16 in a rock 12.

In the schematic example of FIG. 4, the time period from about 90 seconds up to about 110 seconds relates to the normal drilling operation, the normal drilling operation referring in this case to an operating situation wherein the rock material of the rock to be drilled is substantially solid.

At the time instant of about 110 seconds, it can be seen a start of a slow but substantially continuous increase in the level of the energy amplitude of the tensile stress wave of the reflected stress wave, as well as a slight increase in the levels of the energy amplitude of the compressive stress wave and in the level of the rotation pressure, and a start of a decrease in the drilling penetration rate. The behaviour of the measurements takes place in response to the tool 9 approaching the cavity 16 in the rock 12, whereby the rock material in the rock in front of the cavity as seen in the drilling direction bends or vibrates, thereby preventing the stress waves generated into the tool to penetrate through the rock material to the same extent than through a solid rock material.

At the time instant of about 120 seconds the tool enters the cavity, whereby there can be seen a significant and fast increase in the levels of the tensile stress wave of the reflected stress wave and the drilling penetration rate. This behaviour of the measurements is an indication that the tool has finally entered the cavity.

From the example of FIG. 4 it can be seen that by the solution disclosed it is possible to detect proactively that the tool of the rock drilling machine is approaching a cavity before the tool actually enters the cavity so that there is a time period to control the operations of the rock drilling machine so as to avoid the tool to enter the cavity with full drilling power. In the example of FIG. 4 that time period is about 5 to 10 seconds, which is adequate to control the operations of the rock drilling machine accordingly.

The drilling situation disclosed in FIG. 4 provides an example of a drilling situation and respective behaviour of the measurements wherein the tool is approaching the cavity. The behaviour of the measurements may differ from that disclosed in FIG. 4, for example, because of a kind of rock to be drilled, a kind of a tool used in the drilling and a nature of the cavity in the rock to be drilled.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A method of monitoring a rock drilling, the method comprising:
    generating, by an impact mechanism of a rock drilling device, a stress wave which propagates in a tool of the rock drilling device;
    measuring the stress wave propagating in the tool;
    measuring a drilling parameter indicating a drilling penetration rate;
    identifying, from the measured stress wave generated by the impact mechanism propagating in the tool, at least one of a compressive stress wave and a tensile stress wave of a reflected stress wave reflected from a rock to be drilled back to the tool;
    determining at least one property of the at least one of the compressive stress wave and the tensile stress wave of the reflected stress wave;
    detecting, on the basis of a change in the at least one property of the at least one of the compressive stress wave and the tensile stress wave, that the tool is approaching a cavity in the rock before the tool actually enters the cavity;
    initiating at least one cavity-related action in response to detecting the tool approaching the cavity; and
    detecting, on the basis of a change in the drilling parameter indicating the drilling penetration rate and a change in the at least one property of the at least one of the compressive stress wave and the tensile stress wave, that the tool is approaching the cavity in the rock before the tool actually enters the cavity.

2. The method as claimed in claim 1, further comprising controlling at least one operating parameter of the rock drilling device in response to detecting the tool approaching the cavity before the tool actually enters the cavity.

3. The method as claimed in claim 2, wherein the at least one operating parameter of the rock drilling device is at least one of a percussion pressure, a feeding pressure, a rotating pressure, a flushing pressure and a percussion frequency.

4. The method as claimed in claim 1, comprising determining a ratio between the drilling parameter indicating the drilling penetration rate and the at least one property of the at least one of the compressive stress wave and the tensile stress wave of the reflected stress wave, and detecting the tool approaching the cavity on the basis of a change in the determined ratio between the drilling parameter indicating the drilling penetration rate and the at least one property of the at least one of the compressive stress wave and the tensile stress wave of the reflected stress wave.

5. The method as claimed in claim 1, comprising detecting the tool approaching the cavity in response to a decrease in the drilling penetration rate and a decrease in an amplitude of the compressive stress wave of the reflected stress wave before the tool enters the cavity.

6. The method as claimed in claim 1, comprising detecting the tool approaching the cavity in response to a decrease in the drilling penetration rate and an increase in an amplitude of the tensile stress wave of the reflected stress wave before the tool enters the cavity.

7. The method as claimed in claim 1, comprising further measuring a rotation pressure of the rock drilling device, detecting the tool approaching the cavity in response to a combination of the decrease in the drilling penetration rate, an increase in the rotation pressure of the rock drilling device and at least one of the decrease in the amplitude of the compressive stress wave of the reflected stress wave and the increase in the amplitude of the tensile stress wave of the reflected stress wave.

8. A rock drilling device comprising
    a frame;
    a tool;
    an impact mechanism arranged to generate a stress wave, which propagates in the tool;
    measuring means for measuring the stress wave generated by the impact mechanism propagating in the tool;
    measuring means for measuring a drilling parameter indicating a drilling penetration rate; and
    at least one computing unit, wherein the at least one computing unit is configured to identify, from the measured stress wave generated by the impact mechanism propagating in the tool, at least one of a compressive stress wave and a tensile stress wave of a reflected stress wave reflected from a rock to be drilled back to the tool, determine at least one property of the at least one of the compressive stress wave and the tensile stress wave of the reflected stress wave, detect, on the basis of a change in the at least one property of the at least one of the compressive stress wave and the tensile stress wave that the tool is approaching a cavity in the rock before the tool actually enters the cavity, and that the rock drilling device comprises at least one control unit to initiate at least one cavity-related action in response to detecting the tool approaching the cavity, and wherein the at least one computing unit is configured to determine a ratio between the drilling parameter indicating the drilling penetration rate and the at least one property of the at least one of the compressive stress wave and the tensile stress wave of the reflected stress wave, and detect the tool approaching the cavity on the basis of a change in the determined ratio between the drilling parameter indicating the drilling penetration rate and the at least one property of the at least one of the compressive stress wave and the tensile stress wave of the reflected stress wave.

9. The rock drilling device as claimed in claim 8, wherein the at least one computing unit is further configured to detect, on the basis of a change in the drilling parameter indicating the drilling penetration rate and a change in the at least one property of the at least one of the compressive stress wave and the tensile stress wave, that the tool is approaching the cavity in the rock before the tool actually enters the cavity.

10. The rock drilling device as claimed in claim 8, wherein the control unit is configured to control at least one operating parameter of the rock drilling device in response to detecting the tool approaching the cavity before the tool actually enters the cavity.

11. The rock drilling device as claimed in claim 8, wherein the at least one computing unit is configured to detect the tool approaching the cavity in response to a decrease in the drilling penetration rate and a decrease in an amplitude of the compressive stress wave of the reflected stress wave before the tool enters the cavity.

12. The rock drilling device as claimed in claim 8, wherein the at least one computing unit is configured to detect the tool approaching the cavity in response to a decrease in the drilling penetration rate and an increase in an amplitude of the tensile stress wave of the reflected stress wave before the tool enters the cavity.

13. The rock drilling device as claimed in claim 8, further comprising measuring means for measuring a rotation pressure of the rock drilling device, wherein-the at least one computing unit is configured to detect the tool approaching the cavity in response to a combination of the decrease in the drilling penetration rate, an increase in the rotation pressure of the rock drilling device and at least one of the decrease in the amplitude of the compressive stress wave of the reflected stress wave and the increase in the amplitude of the tensile stress wave of the reflected stress wave.

* * * * *